US012415260B2

(12) United States Patent
Franz et al.

(10) Patent No.: US 12,415,260 B2
(45) Date of Patent: Sep. 16, 2025

(54) PYROTECHNIC DRIVING DEVICE

(71) Applicant: Hilti Aktiengesellschaft, Schaan (LI)

(72) Inventors: Karl Franz, Oppenweiler (DE); Matthias Blessing, Frastanz (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/278,270

(22) PCT Filed: Mar. 16, 2022

(86) PCT No.: PCT/EP2022/056854

§ 371 (c)(1),
(2) Date: Aug. 22, 2023

(87) PCT Pub. No.: WO2022/207326

PCT Pub. Date: Oct. 6, 2022

(65) Prior Publication Data

US 2024/0316738 A1 Sep. 26, 2024

(30) Foreign Application Priority Data

Mar. 29, 2021 (EP) .................................... 21165497

(51) Int. Cl.
*B25C 1/14* (2006.01)

(52) U.S. Cl.
CPC .................................... *B25C 1/14* (2013.01)

(58) Field of Classification Search
CPC ................................ B25C 1/14; B25C 1/143
See application file for complete search history.

(56) References Cited

U.S. PATENT DOCUMENTS

| | | | |
|---|---|---|---|
| 4,119,257 A | 10/1978 | Combette et al. | |
| 6,032,846 A | 3/2000 | Clark et al. | |
| 6,321,968 B1 | 11/2001 | Remerowski | |
| 10,245,713 B2 | 4/2019 | Lee | |

(Continued)

FOREIGN PATENT DOCUMENTS

| | | | |
|---|---|---|---|
| CN | 106103001 A | 11/2016 | |
| EP | 2886259 A1 * | 6/2015 | ............ B25C 1/143 |
| EP | 2 923 797 A1 | 9/2015 | |

OTHER PUBLICATIONS

Translation of EP 2886259 A1 (Year: 2015).*

(Continued)

*Primary Examiner* — Thomas M Wittenschlaeger

(74) *Attorney, Agent, or Firm* — Leydig, Voit & Mayer, Ltd.

(57) ABSTRACT

A driving device, comprising a hand-held housing with a piston element arranged therein for the transmission of energy to a fastening element to be driven in a driving direction, a propellant charge, and a combustion chamber, which is arranged between the propellant charge and the piston element and extends around a central axis, and an actuator, by which the energy to be transmitted from the propellant charge to the piston element can be varied in such a way that the energy can be set, wherein a venting channel connected to the combustion chamber can be exposed by means of a movable slide of the actuator, wherein the venting channel opens out into the combustion chamber by a vent opening, which can be partially or completely covered by the slide, and wherein a cross-sectional area of the vent opening increases in the driving direction.

4 Claims, 3 Drawing Sheets

(56) References Cited

U.S. PATENT DOCUMENTS

| | | | |
|---|---|---|---|
| 10,500,703 | B2 | 12/2019 | Blessing |
| 2006/0102111 | A1 | 5/2006 | Ohmori |
| 2011/0198383 | A1 | 8/2011 | Masas et al. |
| 2016/0311097 | A1 | 10/2016 | Blessing |
| 2017/0100830 | A1 | 4/2017 | Blessing |

OTHER PUBLICATIONS

International Searching Authority, International Search Report in International Application No. PCT/EP2022/056854, mailed Jul. 6, 2022.
International Searching Authority, Written Opinion in International Application No. PCT/EP2022/056854, mailed Jul. 6, 2022.

* cited by examiner

PYROTECHNIC DRIVING DEVICE

CROSS-REFERENCE TO RELATED APPLICATIONS

This patent application is the U.S. National Stage of International Patent Application No. PCT/EP2022/056854, filed Mar. 16, 2022, which claims the benefit of European Patent Application No. 21165497.5, filed Mar. 29, 2021, which are each incorporated by reference.

The invention relates to a driving device.

The prior art discloses hand-held driving devices with propellant charges in which the combustion gases resulting after the ignition of a pyrotechnic charge expand in a combustion chamber. This has the effect that a piston is accelerated as an energy transmission means and drives a fastening element into a workpiece. Combustion residues can cause the combustion chamber to become contaminated.

U.S. Pat. No. 6,321,968 B1 describes a driving device with a propellant charge in which the combustion chamber is separated into an upper subchamber and a lower subchamber by means of an orifice plate. The driving device can be adjusted in the volume of its dead space in order to adjustably vary the driving energy of the device. For this purpose, a valve-like slide can be adjusted in a direction perpendicular to a driving axis. In this case, the combustion chamber also has a dead space in the closed position of the slide, the dead space being formed as a clearance in a side wall of the combustion chamber.

The object of the invention is to provide a driving device which allows driving energy to be easily set, if need be over as wide a range as possible, with a given propellant charge.

According to one aspect, a driving device comprises a hand-held housing with a piston element arranged therein for the transmission of energy to a fastening element to be driven in a driving direction, a propellant charge, in particular an exchangeable propellant charge, and a combustion chamber, which is arranged between the propellant charge and the piston element and extends around a central axis, and an actuator, by means of which the energy to be transmitted from the propellant charge to the piston element can be varied in such a way that it can be set, wherein a venting channel connected to the combustion chamber can be exposed by means of a movable slide of the actuator, wherein the venting channel opens out into the combustion chamber by a vent opening, which can be partially or completely covered by the slide, and wherein a cross-sectional area of the vent opening increases in the driving direction. As a result, during a displacement of the slide, at first only a very narrow portion of the vent opening and later a wider portion of the vent opening is exposed. This allows a largely linear dependence of the set energy to be transmitted to the piston element on the displacement distance of the slide. Preferably, the vent opening is arranged in a cylindrical, particularly preferably circular-cylindrical, portion of the combustion chamber.

An advantageous embodiment is characterized in that the driving device has a number of venting channels, which respectively open out into the combustion chamber by a vent opening and have in each case a cross-sectional area which increases in the driving direction.

According to a further aspect, a driving device comprises a hand-held housing with a piston element arranged therein for the transmission of energy to a fastening element to be driven in a driving direction, a propellant charge, in particular an exchangeable propellant charge, and a combustion chamber, which is arranged between the propellant charge and the piston element and extends around a central axis, and an actuator, by means of which the energy to be transmitted from the propellant charge to the piston element can be varied in such a way that it can be set, wherein the combustion chamber has an internal thread and a preferably cylindrical guiding portion, wherein the actuator is arranged in the combustion chamber and has an external thread in engagement with the internal thread and a bearing for mounting the actuator in the guiding portion, wherein a thread gap spacing between the external thread and the internal thread is greater than a bearing gap spacing between the bearing and the guiding portion. As a result, forces and torques which act on the actuator during the combustion in the combustion chamber are transmitted via the bearing to the guiding portion, so that the external thread and the internal thread are relieved. Combustion residues caused by the combustion in the combustion chamber may contribute less to jamming of the actuator, so that the actuator remains more easily adjustable. Preferably, the thread gap spacing is at least twice, particularly preferably at least three times, as great as the bearing gap spacing.

An advantageous embodiment is characterized in that the combustion chamber has a preferably cylindrical further guiding portion, wherein the actuator has a further bearing for mounting the actuator in the further guiding portion, wherein a thread gap spacing between the external thread and the internal thread is greater than a further bearing gap spacing between the further bearing and the further guiding portion. Preferably, the external thread is arranged between the bearing and the further bearing along the central axis. Likewise preferably, the further bearing gap spacing is substantially the same size as the bearing gap spacing.

An advantageous embodiment is characterized in that the internal thread and/or the external thread does not have any thread runout.

An advantageous embodiment is characterized in that the internal thread and/or the external thread has one or more transporting grooves, which in particular run parallel to the driving direction. A further advantageous embodiment is characterized in that the actuator has one or more transporting bores, which in particular run parallel to the driving direction.

An advantageous embodiment is characterized in that a venting channel connected to the combustion chamber can be exposed by means of a movable slide of the actuator. A further advantageous embodiment is characterized in that a starting position of the piston element in relation to the combustion chamber can be set by means of the actuator.

An advantageous embodiment is characterized in that the actuator comprises a threaded sleeve, which preferably has a cylindrical inner wall.

Generally preferably, the piston element is guided in the slide, at least over a first part of its movement. Depending on the detailed design, variable exposure of the venting channel or number of venting channels can take place by an adjustment of the slide in an axial direction and/or in the circumferential direction.

A venting channel in the sense of the invention is any space that can be selectively added to the volume of the combustion chamber by the setting element, in order to vary driving energy in a defined manner by way of the additional expansion space. Preferably, but not necessarily, the venting channel may in this case be connected to an external space. As an alternative or in addition to this, the venting channel may also be a volume of dead space that is not connected to an external space.

In the sense of the invention, driving energy is understood as meaning the energy transmitted to a given fastening element with a given propellant charge. If these boundary conditions are specified, it is made possible by the actuator to vary the resultant driving energy of the fastening element in such a way that it can be set.

In the sense of the invention, a piston element is any means to which kinetic energy is imparted by the ignition of the charge, with the kinetic energy ultimately being transmitted to the fastening element. The piston element often takes the form of a piston, in particular a cylindrical piston. The piston head may be provided with clearances or other structures which further promote turbulence and uniform expansion of the combustion gases.

A central axis in the sense of the invention is an axis which is at least parallel to the movement of the fastening element and passes through a center of the combustion chamber. Preferably, the central axis passes both through the center of the combustion chamber and through a center of the fastening element.

A fastening element in the sense of the invention is generally any anchorage that can be driven in, such as for example a nail, bolt or screw.

Generally advantageously, the slide has a preferably cylindrical inner wall which is formed as part of the combustion chamber. In the case of such an arrangement, the slide expediently also serves for guiding the piston element in a first portion of the movement of the piston.

To achieve easy and intuitive adjustment of the driving energy, the actuator has an operating part which is pivotable about the central axis. The operating part may be any suitable means for manual adjustment, such as for instance a rotatable sleeve as a particularly preferred variant, a pivotable knob or the like. The pivotability of the operating part about the central axis has the effect of achieving easy adjustment and at the same time effective visual monitoring of the value that is set. Such an arrangement also allows easy adjustment even under unfavorable conditions, such as for example when wearing work gloves.

Pivoting of the operating part about the central axis means in this case a deflection of the operating part from a previous position and oriented substantially perpendicularly to the axis. A line of moment or trajectory of the operating part has in this case a radius of curvature which is preferably not less than a distance of the operating part from the central axis. Preferably, but not necessarily, the pivoting is a rotation about the central axis. In this case, the operating part and the slide are preferably connected for conjoint rotation, so that turning of the operating part at the same time brings about turning and adjustment of the slide for regulating the driving energy.

It is generally advantageously provided that the slide has a collar which runs around the central axis and engages in an overlapping manner in a recess of a combustion chamber housing, wherein at least part of the venting channel is formed as an axially extending clearance between the collar and the combustion chamber housing. In this way, as a result of the overlap, a tight seal can be achieved, even with respect to great gas pressures. Moreover, a connection between the venting channel and the combustion chamber may already be exposed directly at a charge-side end of the combustion chamber in such a way that it can be set, which allows adjustability over a great range of the driving energy.

Further features and advantages of the invention are apparent from the exemplary embodiment and from the dependent claims. A preferred exemplary embodiment of the invention is described below and explained in more detail with reference to the appended drawings.

Figure 1:
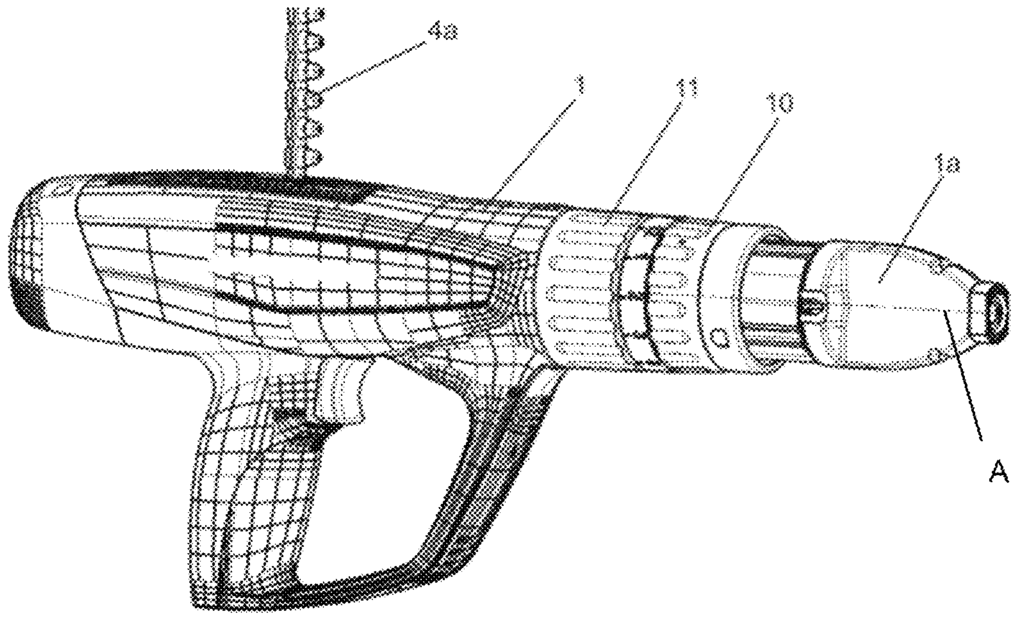
FIG. 1 shows a spatial overall view of a driving device according to the invention.

Shown in FIG. 1 is a driving device. The driving device comprises a hand-held housing 1, in which a piston element in the form of a piston is held. A surface of the piston delimits a combustion chamber, in which the combustion gases of a pyrotechnic charge expand in order to accelerate the piston.

The piston to which kinetic energy is imparted acts with an end tappet on a fastening element (not shown), which is thereby driven into a workpiece (on the right in FIG. 1). The fastening element may be held in particular in a module or magazine (not shown), which is exchangeably attached in a forward holding region 1*a* of the driving device 1.

The charge is in the present case held in a sheet-metal cartridge 4*a*. The cartridge 4*a* has an impact detonator and, before ignition, is inserted into a cartridge bearing by way of a corresponding charging mechanism, in the present case by means of a magazine strip 4 The cartridge 4*a* and the cartridge bearing are then arranged rotationally symmetrically around a central axis A. The central axis A is in the present examples at the same time a central axis of the combustion chamber and of the piston element.

Figure 2:
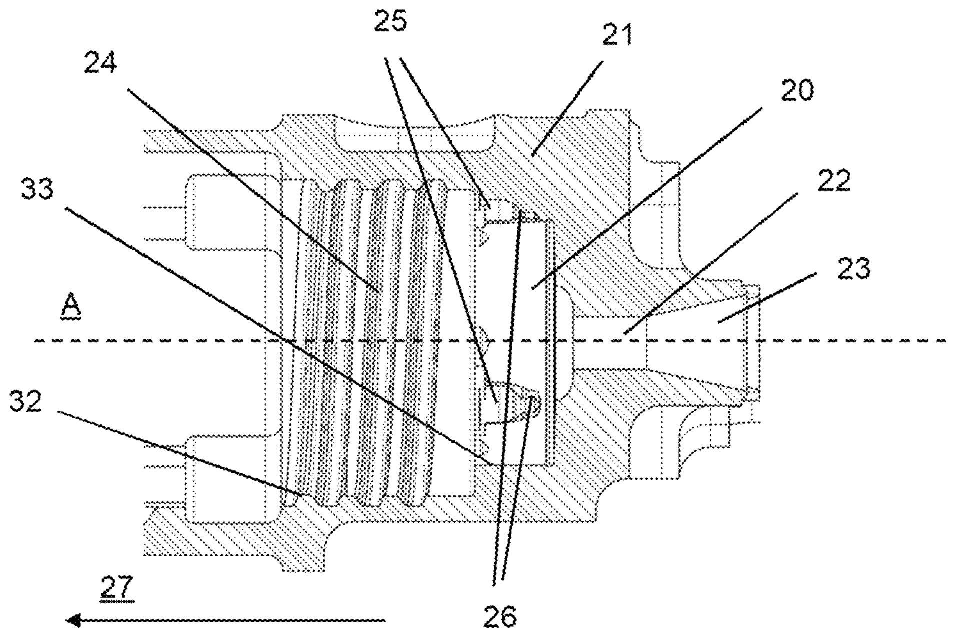
FIG. 2 shows a longitudinal section of a combustion chamber.

Shown in FIG. 2 is a combustion chamber 20, which is formed by a combustion chamber housing 21. The combustion chamber 20 is arranged between a circular opening 22 of the cartridge bearing 23 and the surface of the piston (not shown). At the time of the combustion, the cartridge lies against the cartridge bearing and is enclosed there. In the combustion chamber housing 21 there is a multi-start internal thread 24 in the region of the combustion chamber 20. Connected to the combustion chamber 20 are a number of venting channels 25, in particular two or three, which in each case open out with a vent opening 26 into the combustion chamber 20. A cross-sectional area of each vent opening 26 increases in the driving direction 27. The vent openings 26 are arranged in a circular-cylindrical portion of the combustion chamber 20. Furthermore, the combustion chamber 20 has a circular-cylindrical guiding portion 33 and a further guiding portion 32. The internal thread 24 is arranged between the guiding portion 33 and the further guiding portion 32 along the central axis A.

Figure 3:
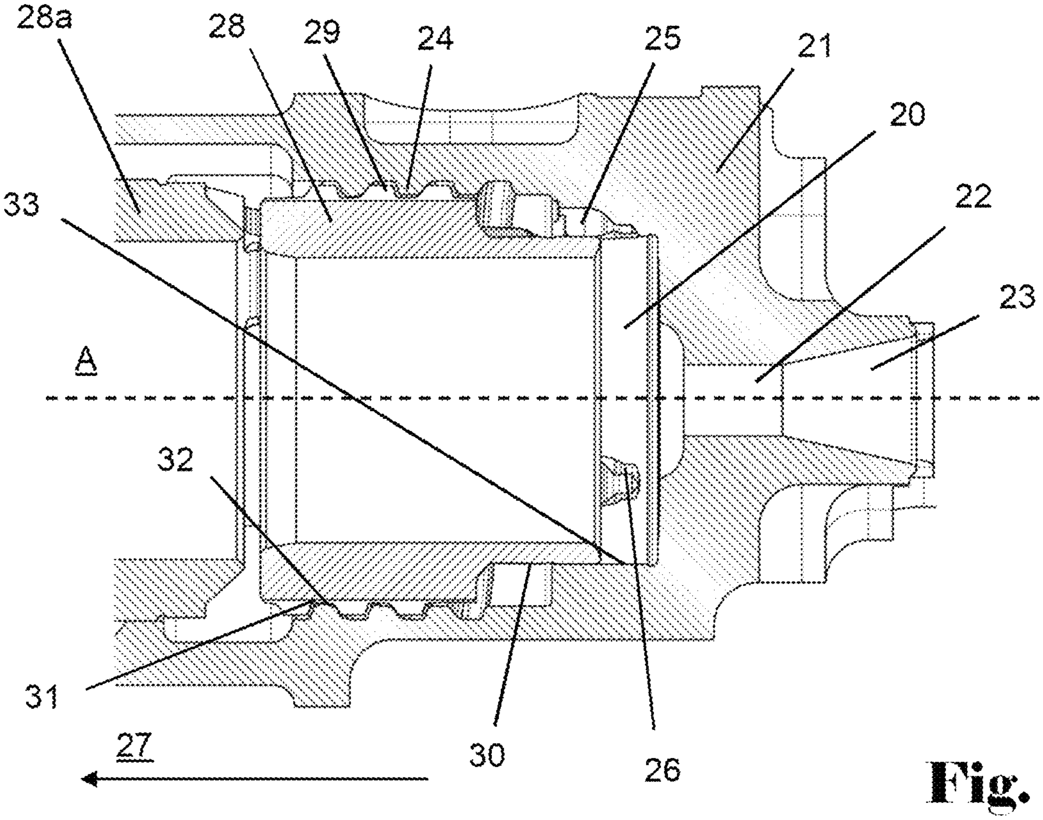
FIG. 3 shows a longitudinal section of a combustion chamber with an actuator in a position for low driving energy.
Figure 4:
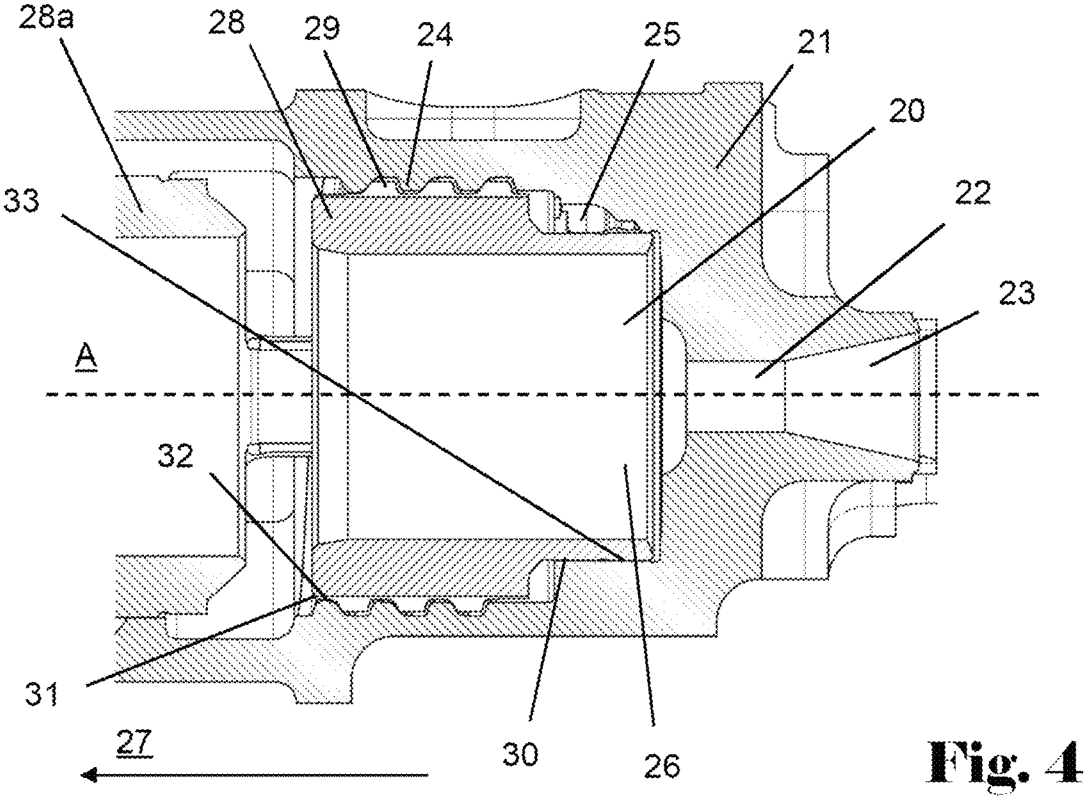
FIG. 4 shows a longitudinal section of a combustion chamber with an actuator in a position for high driving energy.
Figure 5:
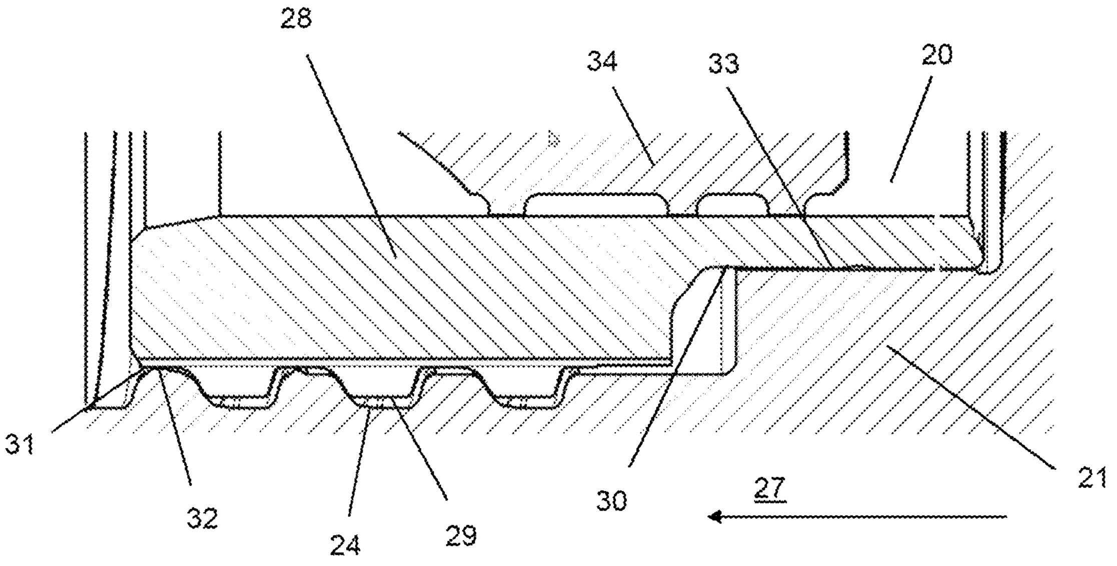
FIG. 5 shows a detail of the longitudinal section in FIG. 4.

In FIGS. 3, 4 and 5, the combustion chamber 20 is shown with an actuator 28 arranged therein. The actuator 28 comprises a threaded sleeve with a cylindrical inner wall and also a piston guide 28*a*. By means of the actuator 28, the energy to be transmitted from the propellant charge to a piston element 34 is variable in such a way that it can be set, by the venting channels 25 being gradually exposed by means of the actuator 28 and additionally or alternatively by a starting position of the piston element 24 in relation to the combustion chamber 20 being set by means of the actuator 28. The fact that the cross-sectional areas of the vent openings 26 increase in the driving direction 27 means that, during a displacement of the actuator 28, at first only a very narrow portion of the vent openings 26 and later a wider portion of the vent openings 26 is exposed in each case. As a result, the energy to be transmitted to the piston element 34 has a linear relationship with the displacement distance of the actuator 28.

The actuator 28 has an external thread 29 in engagement with the internal thread 24 and a bearing 30 for mounting the actuator 28 in the guiding portion 33 and also a further bearing 31 for mounting the actuator 28 in the further guiding portion 32. The external thread 29 is arranged between the bearing 30 and the further bearing 31 along the central axis A. A thread gap spacing between the external thread 29 and the internal thread 24 is approximately four times as great as a bearing gap spacing between the bearing 30 and the guiding portion 33 and/or a bearing gap spacing between the further bearing 31 and the further guiding portion 32. As a result, the external thread 29 and the internal thread 24 are subjected to less loading by forces and torques occurring during the combustion.

A flank angle between a front side 35 of the external thread 29 and/or the internal thread 24 and the central axis A is between 0° and 60°, preferably between 30° and 45°. A transition from the front side 35 to a thread base of the external thread 29 or to a thread back of the internal thread 24 is advantageously provided with a tree-root fillet.

Figure 6:
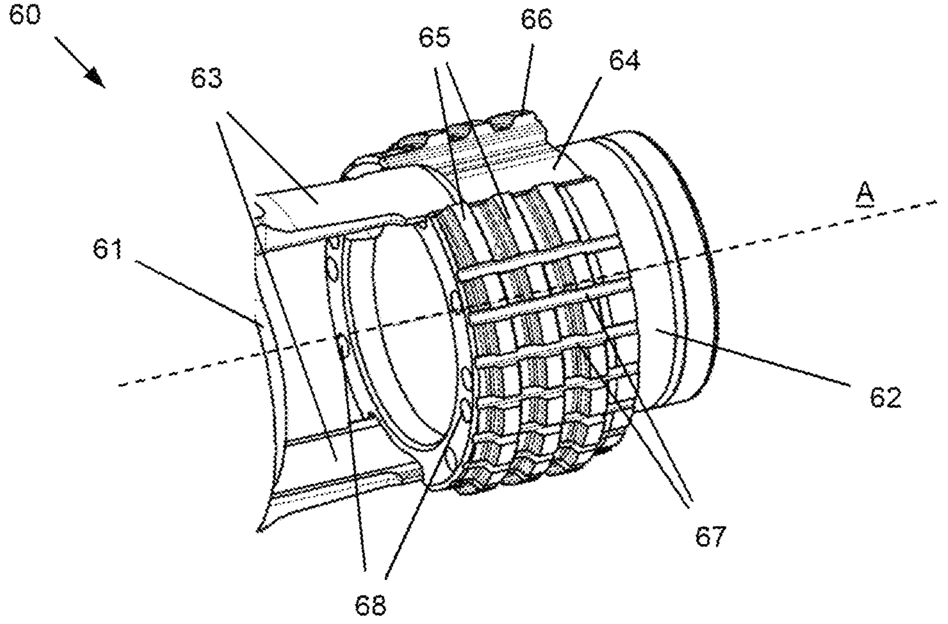
FIG. 6 shows a spatial view of a detail of an actuator.

In FIG. 6, an actuator 60 is depicted in a spatial view of a detail. The actuator 60 comprises a piston guide 61 and a slide 62, which is axially displaceable in relation to the piston guide 61, but during rotation of the piston guide 61 about a central axis A' is turned with it. For this purpose, the piston guide 61 has two claws 63, which engage in two corresponding recesses 64 in the slide 62 for conjoint rotation but axially displaceably. In exemplary embodiments that are not shown, the piston guide is coupled with the slide by means of one, three, four, five or more claws. Advantageously, all of the claws come into engagement with the respective recesses at the same time, so that lateral forces on the slide are reduced. This simultaneous engagement is improved by the claws being designed as bending springs.

The piston guide 61 is for its part connected for conjoint rotation to an operating part 10 (FIG. 1) for conjoint rotation, so that the piston guide 61 at the same time forms a mechanical connection between the operating part 10 and the slide 62. The operating part 10 forms together with the piston guide 61 and the slide 62 the actuator 60 for varying the driving energy of the driving device.

The slide 62 has an external thread 65, which is formed so as to complement an internal thread of a combustion chamber housing (not shown), for example the internal thread 24 (FIG. 2). The external thread 65 does not have a thread runout, but instead ends abruptly with a scraping edge 66, which contributes to cleaning the combustion chamber of combustion residues when circumstances require. In order to allow or assist such combustion residues to be transported away, the external thread 65 has a number of transporting grooves 67 and also a number of transporting bores 68, which in each case run substantially parallel to the driving device. As a result, the actuator 60 remains easily adjustable when circumstances require.

The adjustment of the driving energy works for example as follows:

The slide 62 is screwed with its external thread 61 into the internal thread of the combustion chamber housing. Turning of the operating part, and consequently of the piston guide 61 and the slide 62, about the central axis A accordingly brings about a forcibly controlled axial shift of the slide 62. In preparation for a driving operation, the desired driving energy is set as an energy stage marked on the operating part by turning the operating part. This leads by way of the forced control described above to a corresponding axial positioning of the slide 62 in relation to the combustion chamber housing. As a result, any venting channels there may be are partially exposed over the through-opening (low driving energy, FIG. 3) or closed (maximum driving energy, FIG. 4).

The invention has been described with reference to a number of exemplary embodiments of a setting tool. It goes without saying that all the features of the individual exemplary embodiments can also be realized in a single device in any desired combination, as long as they are not mutually contradictory. It should also be noted that the invention is also suitable for other applications.

The invention claimed is:

1. A driving device, comprising a hand-held housing with a piston element arranged therein for the transmission of energy to a fastening element to be driven in a driving direction; a propellant charge; a combustion chamber, which is arranged between the propellant charge and the piston element and extends around a central axis; and, an actuator, by which the energy to be transmitted from the propellant charge to the piston element can be varied in such a way that the energy can be set, wherein the driving device has a number of venting channels connected to the combustion chamber that can be exposed by a movable slide of the actuator, wherein the number of venting channels respectively open out into the combustion chamber by a vent opening, which can be partially or completely covered by the slide, and wherein the number of venting channels have in each case a cross-sectional area of the vent opening which increases in the driving direction.

2. The driving device as claimed in claim 1, wherein the vent opening is arranged in a cylindrical portion of the combustion chamber.

3. The driving device of claim 2, wherein the vent opening is arranged in a circular-cylindrical portion of the combustion chamber.

4. The driving device of claim 1, wherein the propellant charge is an exchangeable propellant charge.

* * * * *